United States Patent
Ishii et al.

(10) Patent No.: US 7,613,432 B2
(45) Date of Patent: Nov. 3, 2009

(54) METHOD OF CONTROLLING MOBILE COMMUNICATION SYSTEM, CONTROL DEVICE, AND MOBILE COMMUNICATION SYSTEM

(75) Inventors: Hiroyuki Ishii, Yokosuka (JP); Takuya Sato, Yokohama (JP); Hidehiro Ando, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 516 days.

(21) Appl. No.: 11/493,563

(22) Filed: Jul. 27, 2006

(65) Prior Publication Data
US 2007/0037524 A1    Feb. 15, 2007

(30) Foreign Application Priority Data
Aug. 9, 2005    (JP)    ............... 2005-230974

(51) Int. Cl.
*H04B 7/02*    (2006.01)
*H04L 1/02*    (2006.01)

(52) U.S. Cl. .................. 455/101; 455/103; 455/69; 455/506; 375/267; 375/299

(58) Field of Classification Search .......... 455/101, 455/103, 561, 562.1; 375/267, 299; 370/204, 370/334
See application file for complete search history.

(56) References Cited

U.S. PATENT DOCUMENTS

| | | | |
|---|---|---|---|
| 6,067,290 A * | 5/2000 | Paulraj et al. | 370/329 |
| 6,351,499 B1 * | 2/2002 | Paulraj et al. | 375/267 |
| 6,594,473 B1 | 7/2003 | Dabak et al. | |
| 6,721,300 B1 * | 4/2004 | Akiba et al. | 370/342 |
| 6,728,307 B1 * | 4/2004 | Derryberry et al. | 375/219 |
| 6,801,790 B2 * | 10/2004 | Rudrapatna | 455/562.1 |
| 6,862,271 B2 * | 3/2005 | Medvedev et al. | 370/329 |
| 7,072,628 B2 * | 7/2006 | Agashe et al. | 455/140 |
| 7,266,157 B2 * | 9/2007 | Sim et al. | 375/267 |
| 7,366,247 B2 * | 4/2008 | Kim et al. | 375/267 |
| 2002/0034936 A1 | 3/2002 | Itoh | |
| 2002/0186779 A1 * | 12/2002 | Gollamudi | 375/267 |

(Continued)

FOREIGN PATENT DOCUMENTS

EP    1 073 212 A2    1/2001

(Continued)

OTHER PUBLICATIONS

3GPP, "3rd Generation Partnership Project; Technical Specification Group Radio Access Network; Physical layer procedures (FDD) (Release 1999)", 3GPP TS 25.214 V3. 12.0 (Mar. 2003), pp. 1-52, France.

*Primary Examiner*—Duc M Nguyen
(74) *Attorney, Agent, or Firm*—Crowell & Moring LLP

(57) ABSTRACT

A mobile communication system controls switching a transmission diversity system for each channel, and improves the quality of the channel. When the channel type in an uplink is a channel for transmitting voice, open loop transmission diversity is used (steps S1→S3). When the channel type in an uplink is a channel for transmitting a packet, closed loop transmission diversity is used (steps S1→S2). Since the open loop transmission diversity or the closed loop transmission diversity which ever is more appropriate can be used, a transmission diversity system can be appropriately switched for each channel, thereby improving the quality of the channel.

9 Claims, 7 Drawing Sheets

U.S. PATENT DOCUMENTS

2003/0220103 A1 * 11/2003 Kim et al. ................ 455/422.1
2004/0008648 A1 * 1/2004 Schmidl et al. ............ 370/335
2005/0207441 A1 * 9/2005 Onggosanusi et al. ....... 370/464

FOREIGN PATENT DOCUMENTS

| | | | |
|---|---|---|---|
| EP | 1 180 856 A2 | 2/2002 |
| EP | 1 416 692 A2 | 5/2004 |
| JP | 2001-44900 A | 2/2001 |
| JP | 2002-64414 A | 2/2002 |

* cited by examiner

METHOD OF CONTROLLING MOBILE COMMUNICATION SYSTEM, CONTROL DEVICE, AND MOBILE COMMUNICATION SYSTEM

BACKGROUND OF THE INVENTION

1. Field of the Invention

The present invention relates to a method of controlling a mobile communication system, a control device, and a mobile communication system, and more specifically to the control of a transmission diversity system in the mobile communication system.

2. Description of the Related Art

Generally, in a mobile communication system, a momentary level fluctuation can occur on a receiving side due to multi-path fading, etc., thereby greatly degrading the uplink reception characteristic in a radio base station and the downlink reception characteristic in a mobile station. There are the technologies for reducing the degradation such as the reception diversity for reception using a plurality of antennas on a receiving side, the transmission diversity for transmission using a plurality of antennas on a base station side, etc. Since the transmission diversity is a method for reducing the level fluctuation without enlarging the circuit (or increasing the number of antennas) on the receiving side, it is common to apply it in downlink mainly. For example, according to "3GPP RAN TS25.214 V3. c. O, March 2003" (herein after referred to as non-patent document 1), there are two types of transmission diversity, that is, open loop transmission diversity (STTD in the non-patent document 1) for obtaining a diversity effect by performing a predetermined symbol conversion using each antenna of a base station, and closed loop transmission diversity (closed loop mode 1 and closed loop mode 2 in the non-patent document 1) for allowing a mobile station to transmit a feedback command such that the optimum pattern can be obtained for the amplitude and the phase of signals from each antenna, and allowing a base station to determine the transmission phase and amplitude according to the command.

FIG. 8 shows the concept of the open loop transmission diversity (STTD). FIG. 9 shows the concept of the control of closed loop transmission power (closed loop mode 1 or closed loop mode 2).

The STTD as an example of the open loop transmission diversity is explained below by referring to FIG. 8. As shown in FIG. 8, in the STTD, an STTD encoder 3, an antenna Ant 1, and an antenna Ant 2 are provided on the base station side, and an antenna MS Ant and an STTD decoder 4 are provided on the mobile station side.

The STTD encoder shown in FIG. 8 calculates the complex conjugate of an odd symbol, multiplies an even symbol by a minus sign after the calculation of the complex conjugate, inverts the odd symbol and the even symbol, and performs transmission.

When $\alpha_1$ and $\alpha_2$ respectively indicate the fading vector of a transmission line from the antenna 1 (first antenna) to the mobile station, and the fading vector of a transmission line from the antenna 2 (second antenna) to the mobile station, the signals received by the mobile station can be expressed as follows. For simplicity, the noise is not considered in this example.

$$r_1 = \alpha_1 S_1 - \alpha_2 S_2^*$$

$$r_2 = \alpha_1 S_2 + \alpha_2 S_1^* \tag{math 1}$$

This is calculated in a STTD decoder as follows, and the calculation result Output is output.

$$\text{Output } 1 = \alpha_1^* r_1 + \alpha_2 r_2^* = (|\alpha_1|^2 + |\alpha_2|^2) S_1$$

$$\text{Output } 2 = \alpha_2^* r_2 + \alpha_1 r_1^* = (|\alpha_1|^2 + |\alpha_2|^2) S_2 \tag{math 2}$$

Thus, the fading from the antennas 1 and 2 can be combined at the maximum rate.

The closed loop mode 1 is explained below as an example of the closed loop transmission diversity by referring to FIG. 9. In the closed loop mode 1 as shown in FIG. 9, in the closed loop mode 1, multipliers 5 and 6, an FBI decoder 7, and antennas Ant 1 and 2 are provided on the base station side. The antenna MS Ant, a data decoder 8, and a weight selector 9 are provided on the mobile station side. The multiplication weight multiplied in the multipliers 5 and 6 is transmitted from the mobile station side over a dedicated uplink channel, and is decoded in the FBI decoder 7.

The $W_1$ shown in FIG. 9 indicates a multiplication weight of signals transmitted from the antenna Ant 1 by which transmission signals are multiplied, and the $W_2$ indicates a multiplication weight of signals transmitted from the antenna Ant 2 by which transmission signals are multiplied. The weight has the following pattern.

$$(W_1, W_2) = (1, \exp(j\phi)) \tag{math 3}$$

$$\phi = \{\pi/4, 3\pi/4, 5\pi/4, 7\pi/4\}$$

FIG. 10 shows a phase plane of a pattern of the weight $W_2$. The received signals are expressed by the following equation.

$$r = ((\alpha_1 W_1 + \alpha_2 W_2)S \tag{math 4}$$

In the case of the closed loop mode 1, as shown by the (math 3) above, $W_1$ is fixed to 1. Therefore, in the mobile station, $W_2$ is determined to maximize $\alpha_1 W_1 + \alpha_2 W_2$, a positive or negative value of I-axis component of $W_2$ is specified by an odd time slot, and a positive or negative value of Q-axis component of $W_2$ is specified by an even time slot. In the base station, transmission is performed using the latest I-axis and Q-axis components.

The time slot is constituted by a dedicated physical data channel (DPDCH) and a dedicated physical control channel (DPCCH) as shown in FIG. 10. In FIG. 10, the dedicated physical data channel is constituted by the data unit (Data) of $N_{data}$-bit. The dedicated physical control channel is constituted by an $N_{pilot}$-bit pilot unit (Pilot), an $N_{TFCI}$-bit TFCI (transport format combination indicator) unit, an $N_{FBI}$-bit FBI (feedback information) unit, and an $N_{TPC}$-bit TPC unit. The weight is updated using an FBI unit (herein after referred to as an FBI bit) assigned to the DPCCH.

In the closed loop data decoder, the following calculation is performed to obtain the original signals. In the equation the noise component is omitted for simplicity.

$$\text{Output } 2 = (\alpha_1 W_1 + \alpha_2 W_2) r = |\alpha_1 W_1 + \alpha_2 W_2|^2 S \tag{math 5}$$

The received signals can obtain a gain (beam forming gain) for in-phase, and a larger gain can be ideally obtained as compared with the open loop transmission diversity. However, the above-mentioned FBI bit can erroneously be detected in uplink, and the more states in which the weight used in the base station is different from the weight assumed by the mobile station occur, the more easily the quality is degraded.

To reduce the degradation by the FBI bit error, the mobile station can perform antenna verification to estimate the weight used in the base station with higher accuracy. The Annex A of the non-patent document 1 shows an example of the method. As shown in the above-mentioned example, the determination accuracy is enhanced by assuming a BER (bit error rate) in the uplink of the FBI bit, and including a presumed probability. However, although the antenna verification is correctly performed, there occur the degradation in beam forming gain due to an FBI bit error, and an antenna verification error by mistakenly estimating the weight used by the base station. Therefore, when the FBI bit error rate increases, it is stated that the gain of the closed loop transmission diversity is degraded.

As a conclusion, when the FBI bit error rate is low in the uplink from the mobile station to the base station, a larger gain is obtained by the closed loop transmission diversity than by the open loop transmission diversity, but when the FBI bit error rate in the uplink is high, a gain can be more stably obtained by the open loop transmission diversity than by the closed loop transmission diversity.

The FBI bit error rate depends on the transmission rate of the channel in the uplink, a spreading factor, a transmission time interval (transmission time interval: herein after referred to as a TTI for short), the number of FBI bits, a target error rate and a slot format. Normally, when the transmission rate is high, the FBI bit error rate is low. When the transmission rate is low, the FBI bit error rate is high. An FBI bit is mapped over the dedicated physical control channel DPCCH (dedicated physical control channel), not over the dedicated physical data channel DPDCH (dedicated physical data channel). Therefore, when a comparison is made between a low amplitude ratio of the DPCCH to the DPDCH and a high amplitude ratio, the FBI bit error rate is lower when the amplitude ratio is high.

JP2002-64414A (herein after referred to as patent document 1) describes the technology of applying the closed loop transmission diversity according to the application request information when a predetermined condition is satisfied, for example, when there is no fluctuation of radio transmission line characteristic, etc.

SUMMARY OF THE INVENTION

As described above, the closed loop transmission diversity can obtain a larger gain than the open loop transmission diversity when an FBI bit error rate is low. However, the closed loop transmission diversity can obtain a smaller gain than the open loop transmission diversity when an FBI bit error rate is high.

The FBI bit error rate depends on the channel type of an uplink, or the transmission rate, the spreading factor, the TTI, the number of FBI bits, the target error rate, and the slot format. Normally, when a transmission rate is high, or when the power of the DPCCH is high, the FBI bit error rate becomes low. When the transmission rate is low, or when the power of the DPCCH is low, the FBI bit error rate becomes high.

The present invention has been developed to solve the above described problems of the conventional technology, and the object of the present invention is to provide a method of controlling a mobile communication system, a control device, and a mobile communication system capable of improving the quality of a channel by performing control of switching a transmission diversity system for each channel by applying the closed loop transmission diversity to a channel estimated to have a low FBI error rate in an uplink, and applying the open loop transmission diversity to a channel estimated to have a high FBI error rate.

The method of controlling a mobile communication system according to claims of the present invention includes a radio base station to which transmission diversity of performing radio transmission using a plurality of antennas is applied, and a mobile station for communicating with the radio base station. A transmission diversity system is determined according to the information about a channel in an uplink from the mobile station to the radio base station. Thus, the transmission diversity system can be appropriately switched for each channel, thereby improving the quality of the channel.

In the transmission control method for the mobile communication system according to claims of the present invention, the information about the channel in the uplink is a channel type, open loop transmission diversity is used when the channel type refers to a channel for transmitting voice, and closed loop transmission diversity is used when the channel type refers to a channel for transmitting a packet. Thus, the open loop transmission diversity or the closed loop transmission diversity which ever is more appropriate can be used.

In the method of controlling a mobile communication system according to claims of the present invention, the information about the channel in the uplink is a transmission rate of a channel in an uplink, an amplitude ratio of a control channel to a data channel, a transmission time interval, a target error rate, and a slot format, based on at least one of which a transmission diversity system is determined. Thus, the transmission diversity system can be more appropriately determined.

In the method of controlling a mobile communication system according to claims of the present invention, the transmission diversity system control means uses open loop transmission diversity when the transmission rate of the channel in the uplink is low, and uses closed loop transmission diversity when the transmission rate of the uplink is high. Thus, the open loop transmission diversity or the closed loop transmission diversity which ever is more appropriate can be used.

In the method of controlling a mobile communication system according to claims of the present invention, the information about the channel in the uplink is a signal-to-interference power ratio of a physical control channel of the uplink, and a signal-to-interference power ratio of pilot signals (for example, the pilot unit shown in FIG. 11) based on at least one of which a transmission diversity system is determined. Thus, the transmission diversity system can be more appropriately determined based on the SIR which changes from moment to moment.

The control device according to claims of the present invention controls the execution of transmission diversity of a radio base station for performing wireless transmission with a mobile station using a plurality of antennas, and includes transmission diversity system control means for determining a transmission diversity system according to the information about a channel in an uplink from the mobile station. Using the control device with the above-mentioned configuration, a transmission diversity system can be appropriately switched for each channel, thereby improving the quality of a channel.

In the control device according to claims of the present invention, the information about the channel in the uplink is a channel type, and the transmission diversity system control means uses open loop transmission diversity when the channel type refers to a channel for transmitting voice, and uses closed loop transmission diversity when the channel type refers to a channel for transmitting a packet. With the control device, the open loop transmission diversity or the closed loop transmission diversity which ever is more appropriate can be used.

In the control device according to claims of the present invention, the information about the channel in the uplink is a transmission rate of a channel in the uplink, an amplitude ratio of a control channel to a data channel, a transmission time interval, a target error rate, and a slot format, based on at least one of which the transmission diversity system control means determines a transmission diversity system. With the configuration of the control device, a transmission diversity system can be more appropriately determined.

In the control device according to claims of the present invention, the transmission diversity system control means uses open loop transmission diversity when the transmission rate of the channel in the uplink is low, and uses closed loop transmission diversity when the transmission rate of the uplink is high. With the control device, the open loop transmission diversity or the closed loop transmission diversity which ever is more appropriate can be used.

In the control device according to claims of the present invention, the information about the channel in the uplink is a signal-to-interference power ratio (herein after referred to as a SIR) of a physical control channel of the uplink, and a signal-to-interference power ratio of pilot signals (for example, the pilot unit shown in FIG. 11), based on at least one of which the transmission diversity system control means determines a transmission diversity system. Thus, the transmission diversity system can be more appropriately determined based on the SIR which changes from moment to moment.

The mobile communication system according to claims of the present invention includes a mobile station, a radio base station for performing wireless transmission to the mobile station using a plurality of antennas, and a radio network controller for controlling the mobile station and the radio base station, and controls execution of transmission diversity of the radio base station. The control device according to the claims is provided for at least one of the mobile station, the radio base station, and the radio network controller. With the configuration of the mobile communication system, a transmission diversity system can be more appropriately switched for each channel, thereby improving the quality of a channel.

As explained above, the quality of the downlink, for example, the BLER (block error rate), and a required transmission power can be improved according to the present invention by determining the transmission diversity system based on the channel type of an uplink, the transmission rate, etc.

DETAILED DESCRIPTION OF THE PREFERRED EMBODIMENTS

Figure 1:
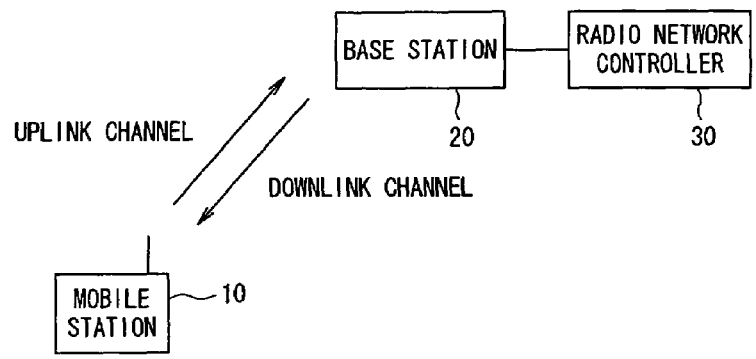
FIG. 1 is a block diagram showing an example of the configuration of the mobile communication system according to a mode for embodying the present invention.

The modes for embodying the present invention are described below by referring to the attached drawings. In the following explanation, a component commonly used in other figures is identified by the same reference numeral.

(Mobile Communication System)

The modes for embodying the present invention are explained below by referring to the attached drawings. FIG. 1 shows an example of the system configuration of the mobile communication system to which the present invention is applied. As shown in FIG. 1, it is assumed that the mobile communication system includes a mobile station 10, a base station 20 for performing wireless communication with the mobile station 10 using a plurality of antennas, and a radio network controller 30 for controlling the mobile station 10 and the base station 20.

The present invention controls switching the transmission diversity system of a downlink depending on the channel type of an uplink when the transmission diversity is applied in the downlink, and the descriptions of the components not related to the present invention are omitted.

Figure 2:
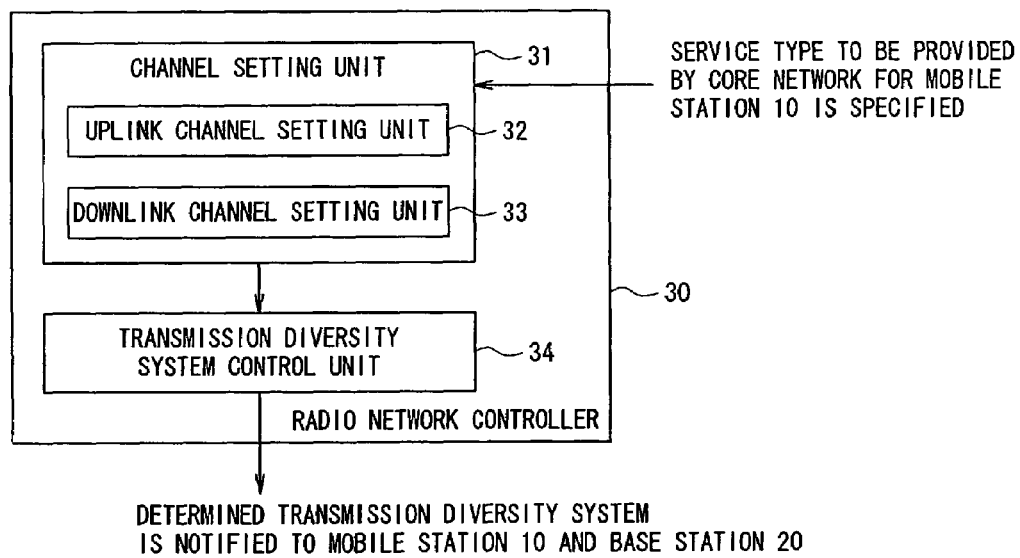
FIG. 2 is a block diagram showing the function of the configuration example of the radio network controller 30 shown in FIG. 1.

FIG. 2 is a block diagram showing the function of the configuration example of the radio network controller 30 according to the mode for embodying the present invention. As shown in FIG. 2, the radio network controller 30 includes a channel setting unit 31 and a transmission diversity system control unit 34 for determining the transmission diversity system. The channel setting unit 31 includes an uplink channel setting unit 32 and a downlink channel setting unit 33. FIG. 2 shows only the portion for setting a radio channel and the portion for determining the transmission diversity system related to the present mode for embodying the present invention in the radio network controller 30.

In this example, the transmission diversity system control unit 34 is provided in the radio network controller 30, but the transmission diversity system can also be determined by providing the transmission diversity system control unit 34 in the mobile station 10 or the base station 20.

(Channel Setting Unit)

The channel setting unit 31 acquires the information about the service type provided for the mobile station 10 from a core network such as the information about voice communications, a television telephone, packet communications, etc., and sets a parameter of an uplink channel and a parameter of a downlink channel respectively in the uplink channel setting unit 32 and the downlink channel setting unit 33 in the channel setting unit 31.

The parameter refers to, for example, a transmission rate and a spreading factor, a TTI, the number of FBI bits, a target error rate, the amplitude ratio of the DPCCH to the DPDCH (uplink only), a slot format, etc. The channel setting unit 31 notifies the transmission diversity system control unit 34 of the parameter of the uplink set as described above, that is, a transmission rate and a spreading factor, a TTI, a target error rate, the amplitude ratio of the DPCCH to the DPDCH (uplink only), a slot format, etc.

The channel setting unit 31 can inform about not only the above-mentioned parameter, but also the service type, for example, voice, a television telephone, packet communication, etc. to be transmitted through the uplink.

(Transmission Diversity System Control Unit)

The transmission diversity system control unit 34 receives from the channel setting unit 31 the parameter of the uplink, that is, a transmission rate and a spreading factor, a TTI, a target error rate, the amplitude ratio of the DPCCH to the DPDCH, a slot format, etc., or a channel type of the uplink. Then, it determines the transmission diversity system based on at least one of the transmission rate and the spreading factor, the TTI, the target error rate, the amplitude ratio of the DPCCH to the DPDCH, the slot format, etc., or a channel type of the uplink. The determined transmission diversity system is transmitted to the mobile station 10 and the base station 20.

For example, the transmission diversity system control unit 34 can determine that the transmission diversity system is open loop transmission diversity when the channel of the uplink is a channel for transmitting voice signals, and can determine that the transmission diversity system is closed loop transmission diversity when the channel type of the uplink is a channel for transmitting packet signals.

For example, the transmission diversity system control unit 34 can determine that the transmission diversity system is open loop transmission diversity when the transmission rate of the channel of the uplink is equal to or less than 32 kbps, and can determine that the transmission diversity system is closed loop transmission diversity when the transmission rate of channel type of the uplink is not equal to or less than 32 kbps.

For example, it also can determine that the transmission diversity system is open loop transmission diversity when the amplitude ratio of the DPCCH to the DPDCH of the uplink is lower than 12/15, and can determine that the transmission diversity system is closed loop transmission diversity when the amplitude ratio of the DPCCH to the DPDCH of the uplink is equal to or higher than 12/15.

It also can determine the transmission diversity system based on both the transmission rate and the amplitude ratio of the DPCCH to the DPDCH of the uplink. For example, it can determine that the transmission diversity system is open loop transmission diversity when the transmission rate is equal to or less than 32 kbps and the amplitude ratio of the DPCCH to the DPDCH of the uplink is lower than 12/15, can determine that the transmission diversity system is closed loop transmission diversity when the transmission rate is equal to or less than 32 kbps and the amplitude ratio of the DPCCH to the DPDCH of the uplink is equal to or higher than 12/15, and can constantly determine that the transmission diversity system is closed loop transmission diversity when the transmission rate is more than 32 kbps.

The transmission diversity system control unit 34 can determine the transmission diversity system based on the SIR (Signal to Interference Ratio) of the physical control channel of the uplink, or the SIR value of the pilot signals. That is, if the SIR value is equal to or higher than a predetermined threshold, it can be determined that the transmission diversity system is closed loop transmission diversity. If it is lower than the predetermined threshold, it can be determined that the transmission diversity system is open loop transmission diversity. Thus, the transmission diversity system can be more appropriately determined based on the SIR which changes from moment to moment. The SIR value is measured by the base station 20, and the measurement result can be notified to the transmission diversity system control unit 34 in the radio network controller 30. Otherwise, in the base station 20, the transmission diversity system can be determined from the SIR, and the determination result can be notified to the radio network controller 30.

In the explanation above, the transmission diversity system control unit 34 determines the transmission diversity system using the channel type of the uplink, the transmission rate, etc. However, since the channels of the uplink and the downlink are typically symmetric, the transmission diversity system can be determined using the channel type of the downlink, the transmission rate, etc. instead of the channel type of the uplink, the transmission rate, etc.

(Communication Control Method for Mobile Communication System)

Figure 3:
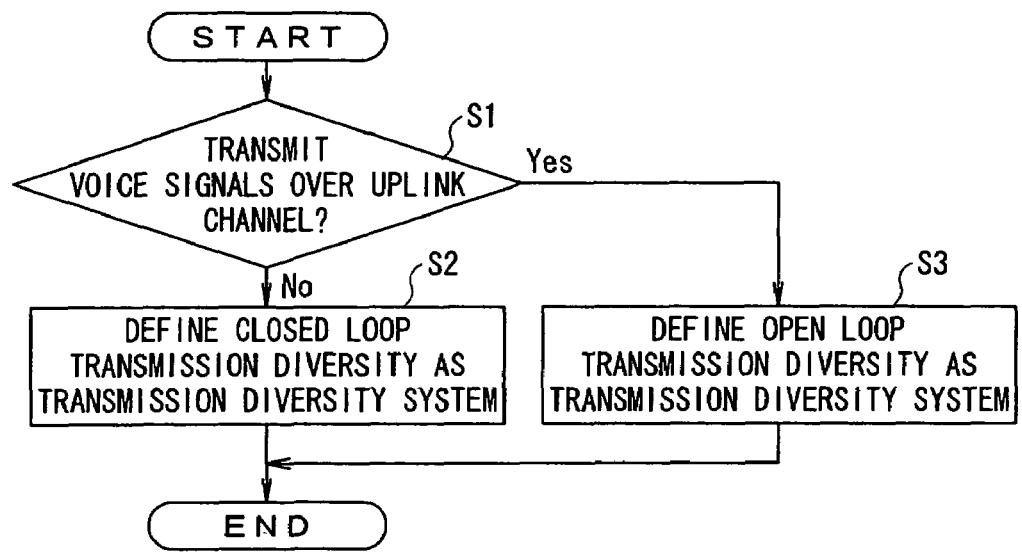
FIG. 3 is a flowchart of the transmission diversity system depending on the channel type.

Next, the communication control method for the mobile communication system according to the present invention is explained by referring to the flowchart shown in FIG. 3.

(Transmission Diversity System Depending on Channel Type)

First, in step S1 shown in FIG. 3, it is determined whether or not the channel of the uplink transmits voice signals. If it is determined that the channel transmits voice signals, then control is passed to step S3. If it is determined that the channel does not transmit voice signals, then control is passed to step S2.

In step S2, it is determined that the closed loop transmission diversity is applied to the channel as a transmission diversity system.

In step S3, it is determined that the open loop transmission diversity is applied to the channel as a transmission diversity system.

(Transmission Diversity System Depending on Transmission Rate of Uplink)

An other mode of the receiving method using the reception device according to the present invention is described below by referring to the flowchart shown in FIG. 4.

Figure 4:
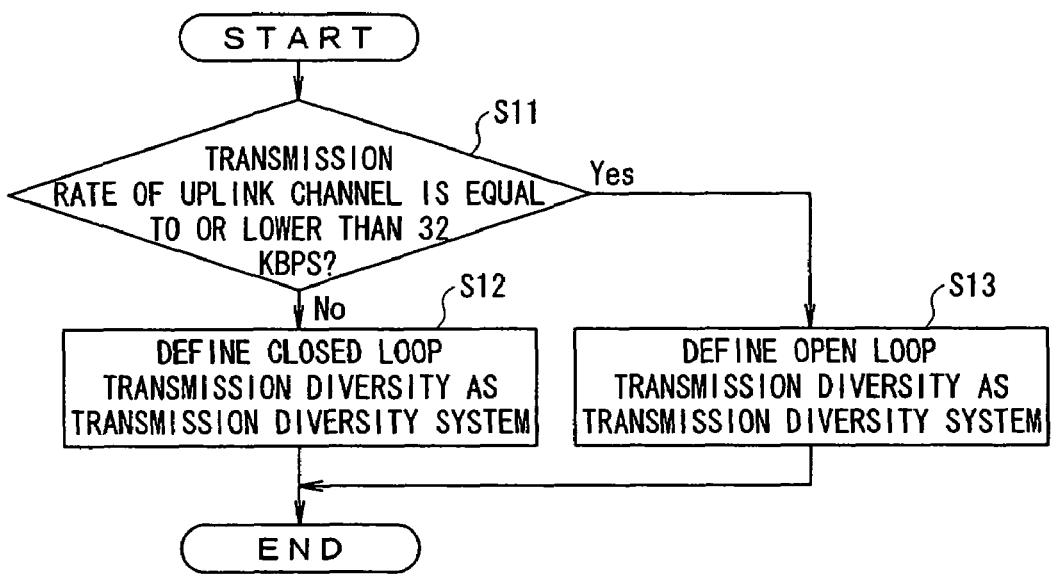
FIG. 4 is a flowchart of the transmission diversity system depending on the transmission rate of the uplink.

First, in step S11 shown in FIG. 4, it is determined whether or not the transmission rate of the uplink is equal to or less than 32 kbps. If it is determined that the transmission rate of the uplink is equal to or less than 32 kbps, then control is passed to step S13. If it is determined that the transmission rate of the uplink is not equal to or less than 32 kbps, then control is passed to step S12.

In step S12, it is determined that the closed loop transmission diversity is applied to the channel as a transmission diversity system.

In step S13, it is determined that the open loop transmission diversity is applied to the channel as a transmission diversity system.

The transmission diversity system can be determined by discriminating whether or not the transmission rate of the uplink is equal to or less than 32 kbps. However, it also can be determined depending on the transmission rate other than 32 kbps.

(Transmission Diversity System Depending on Amplitude Ratio of Control Channel)

Another mode of the receiving method using the reception device according to the present invention is described below by referring to the flowchart shown in FIG. 5.

Figure 5:
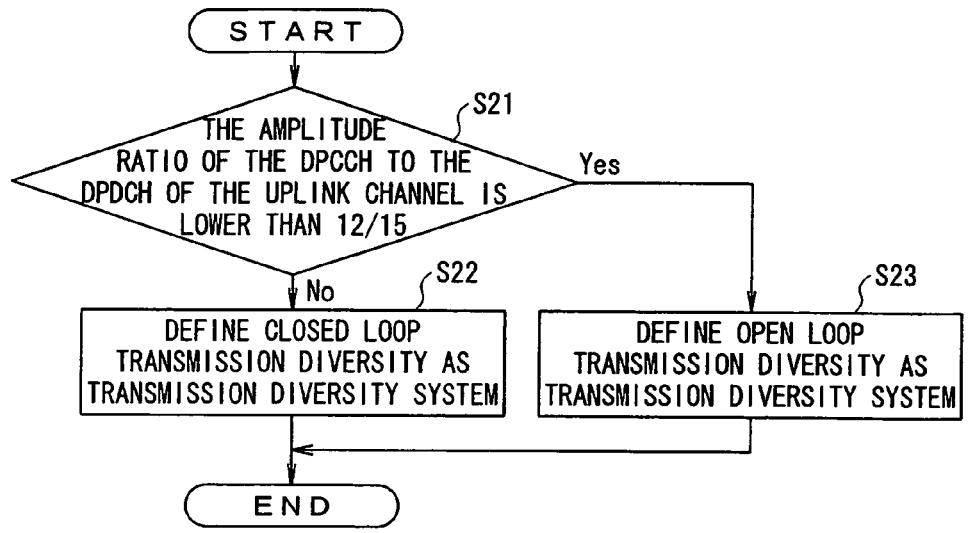
FIG. 5 is a flowchart of the transmission diversity system depending on the amplitude ratio of the control channel.

First, it is determined in step S21 shown in FIG. 5 whether or not the amplitude ratio of the DPCCH to the DPDCH of the uplink is lower than 12/15. If it is determined that the amplitude ratio of the DPCCH to the DPDCH of the uplink is lower than 12/15, then control is passed to step S23. If it is determined that the amplitude ratio of the DPCCH to the DPDCH of the uplink is not lower than 12/15, then control is passed to step S22.

In step S22, it is determined that the closed loop transmission diversity is applied to the channel as a transmission diversity system.

In step S23, it is determined that the open loop transmission diversity is applied to the channel as a transmission diversity system.

In the process above, the transmission diversity system is determined depending on whether or not the amplitude ratio of the DPCCH to the DPDCH of the uplink is lower than 12/15, but it also can be determined depending on the value other than 12/15.

(Transmission Diversity System Depending on the Transmission Rate and the Amplitude Ratio)

An other mode of the receiving method using the reception device according to the present invention is described below by referring to the flowchart shown in FIG. 6.

Figure 6:
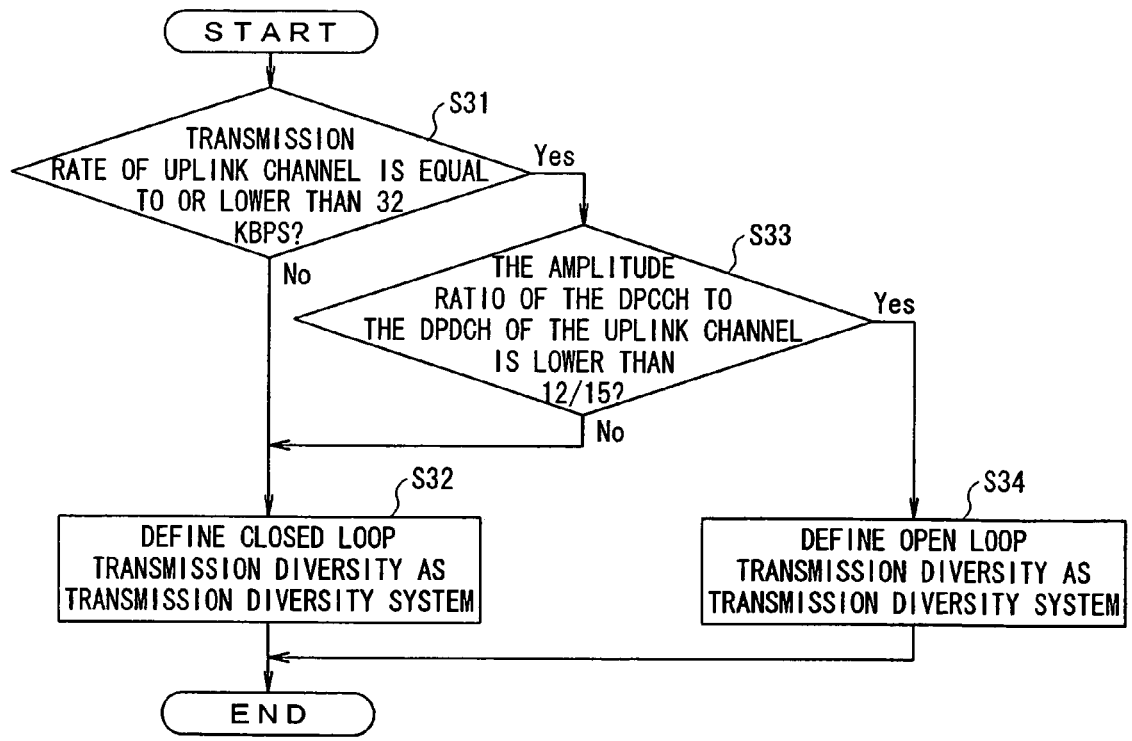
FIG. 6 is a flowchart of the transmission diversity system depending on the transmission rate and the amplitude ratio.

First, in step S31 shown in FIG. 6, it is determined whether or not the transmission rate of the uplink is equal to or less than 32 kbps. If it is determined that the transmission rate of the uplink is equal to or less than 32 kbps, then control is passed to step S33. If it is determined that the transmission rate of the uplink is not equal to or less than 32 kbps, then control is passed to step S32.

It is determined in step S33 whether or not the amplitude ratio of the DPCCH to the DPDCH of the uplink is lower than 12/15. If it is determined that the amplitude ratio of the DPCCH to the DPDCH of the uplink is lower than 12/15, then control is passed to step S34. If it is determined that the amplitude ratio of the DPCCH to the DPDCH of the uplink is not lower than 12/15, then control is passed to step S32.

In step S32, it is determined that the closed loop transmission diversity is applied to the channel as a transmission diversity system.

In step S34, it is determined that the open loop transmission diversity is applied to the channel as a transmission diversity system.

(Transmission Diversity System Depending on SIR)

An other mode of the receiving method using the reception device according to the present invention is described below by referring to the flowchart shown in FIG. 7.

Figure 7:
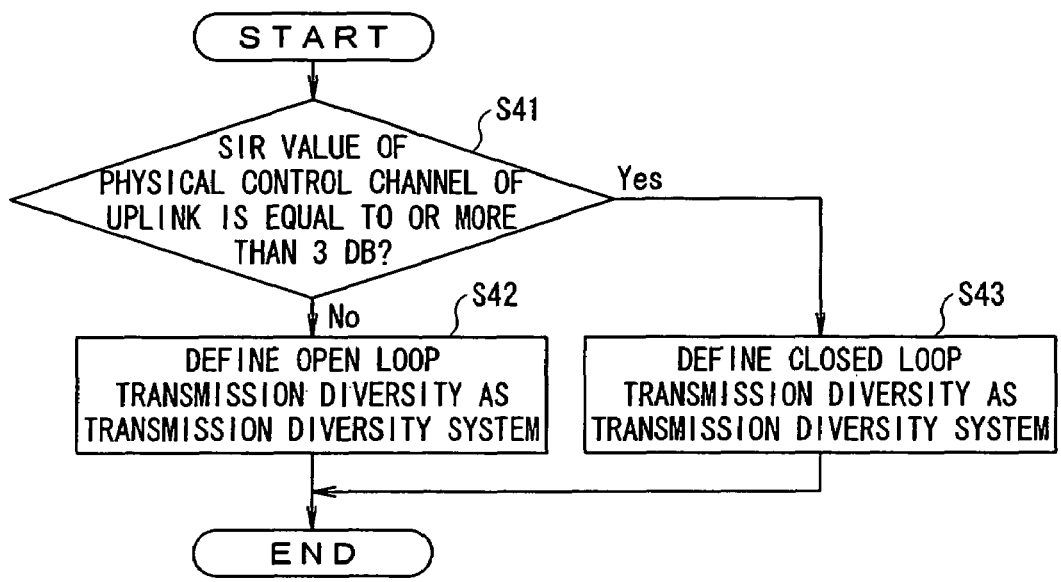
FIG. 7 is a flowchart of the transmission diversity system depending on the SIR.
Figure 8:
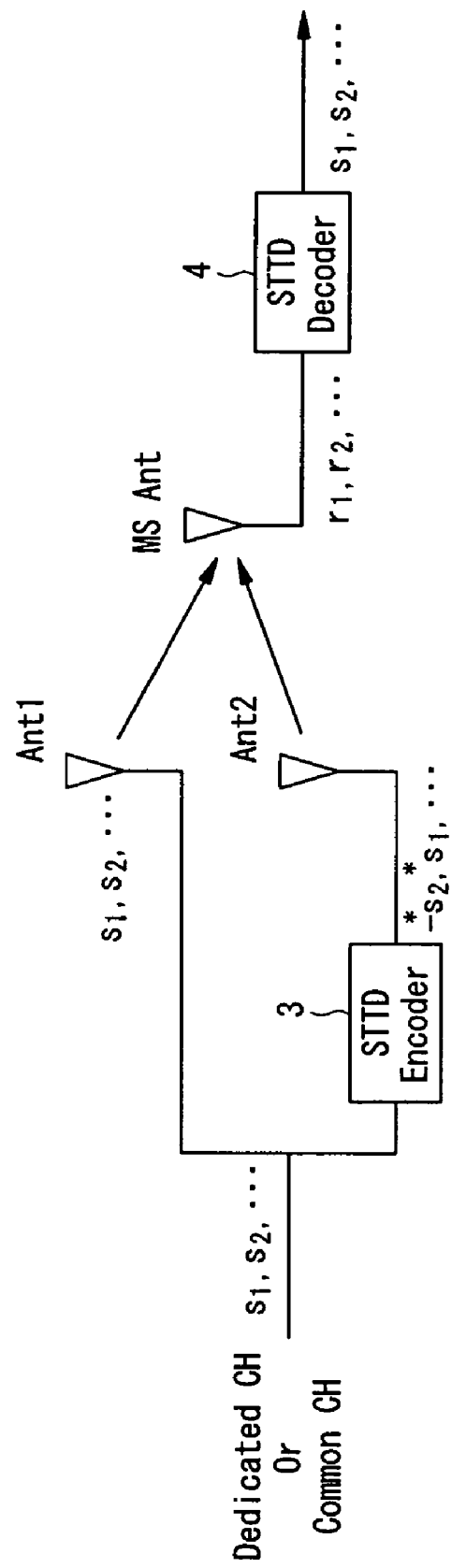
FIG. 8 shows the concept of the open loop transmission diversity (STTD)
Figure 9:
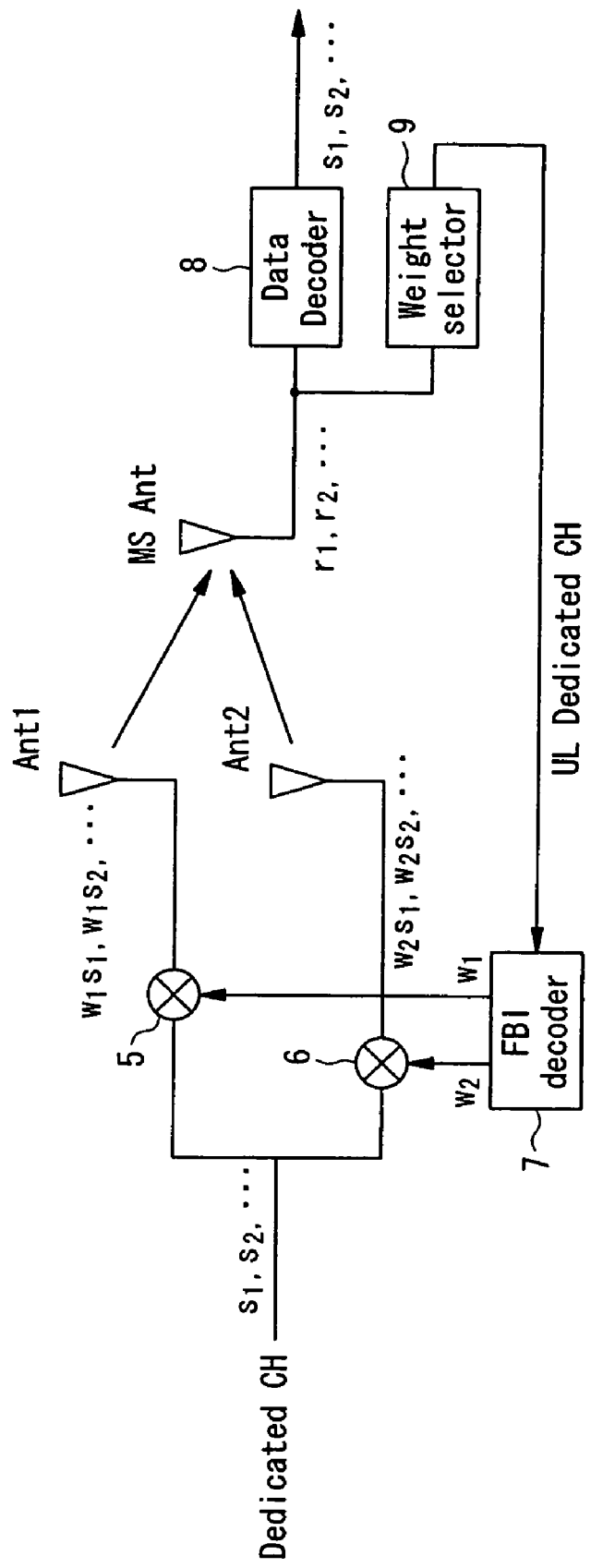
FIG. 9 shows the concept of the closed loop transmission diversity (closed loop mode 1 or 2)
Figure 10:
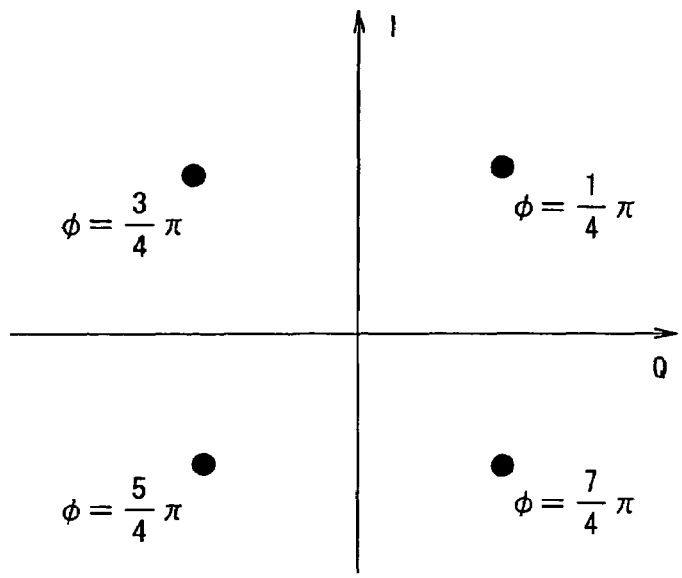
FIG. 10 shows the phase pattern of the weight $W_2$.

First, it is determined in step S41 shown in FIG. 7 whether or not the SIR value of the physical control channel of the uplink is equal to or higher than 3 dB. If it is determined that the SIR value is equal to or higher than 3 dB, control is passed to step S43. If it is determined that the SIR value is not equal to or higher than 3 dB, control is passed to step S42.

In step S43, it is determined that the closed loop transmission diversity is applied to the channel as a transmission diversity system.

In step S42, it is determined that the open loop transmission diversity is applied to the channel as a transmission diversity system.

Figure 11:
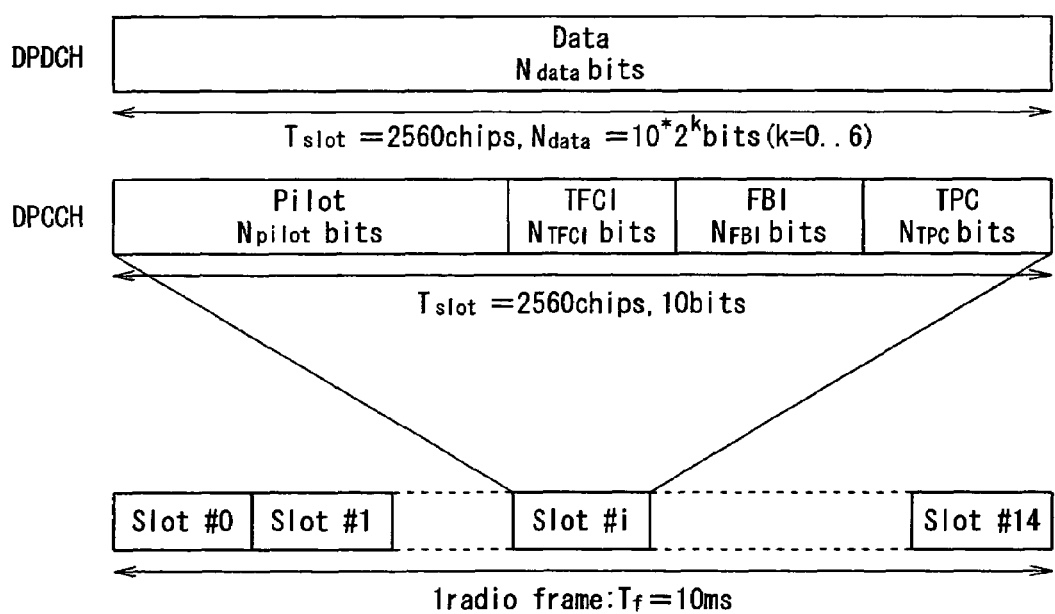
FIG. 11 shows the slot format of the DPDCH and the DPCCH of the uplink.

In the above-mentioned receiving method, the transmission diversity system can be more appropriately determined based on the SIR which changes from moment to moment. In the explanation above, the transmission diversity system is determined based on the SIR of the physical control channel of the uplink, but it also can be determined based on the SIR value of the pilot signals (for example, the pilot unit shown in FIG. 11).

CONCLUSION

As explained above, according to the mode for embodying the present invention, the transmission diversity system can be determined based on the channel type of the uplink, the transmission rate, etc. As a result, an appropriate transmission diversity system can be applied to each channel. Therefore, an error rate of each channel can be reduced. When the transmission power control is performed, the transmission power to be assigned to the channel can be reduced.

For example, since a channel for transmitting a packet generally has a higher transmission rate than a channel for transmitting voice, it can be estimated that an FBI bit error rate is high in the case of the channel for transmitting voice, and it is low in the case of the channel for transmitting a packet.

Therefore, the open loop transmission diversity is applied to a channel for transmitting voice while the closed loop transmission diversity is applied to a channel for transmitting a packet, thereby improving the radio characteristic of the channel.

Also, the embodiment described above relates to a wideband Code Division Multiple Access (WCDMA) system in the 3GPP (3rd Generation Partnership Project). However, the present invention is not limited to the WCDMA, but can be applied to another communication system using transmission diversity in a mobile communication system, to the MIMO (multiple input multiple output) system using feedback information, and to an adaptive array antenna system.

The present invention can be used in controlling the transmission diversity system in a mobile communication system.

What is claimed is:

1. A method of controlling a mobile communication system, comprising a radio base station to which transmission diversity of performing radio transmission using a plurality of antennas is applied, and a mobile station for communicating with the radio base station, wherein a transmission diversity system is determined according to information about a channel in an uplink from the mobile station to the radio base station and wherein the information about the channel in the uplink is a channel type, open loop transmission diversity is used when the channel type refers to a channel for transmitting voice, and closed loop transmission diversity is used when the channel type refers to a channel for transmitting a packet.

2. The method of controlling a mobile communication system according to claim 1, wherein the information about the channel in the uplink is a signal-to-interference power ratio of a physical control channel of the uplink, and a signal-to-interference power ratio of pilot signals based on at least one of which a transmission diversity system is determined.

3. A method of controlling a mobile communication system, comprising a radio base station to which transmission diversity of performing radio transmission using a plurality of antennas is applied, and a mobile station for communicating with the radio base station, wherein a transmission diversity system is determined according to information about a channel in an uplink from the mobile station to the radio base station, wherein the information about the channel in the uplink is a transmission rate of a channel in an uplink, an amplitude ratio of a control channel to a data channel, a transmission time interval, a target error rate, and a slot format, based on at least one of which a transmission diversity system is determined, and wherein the transmission diversity system control means uses open loop transmission diversity when the transmission rate of the channel in the uplink is low, and uses closed loop transmission diversity when the transmission rate of the uplink is high.

4. A control device which controls execution of transmission diversity of a radio base station for performing wireless transmission with a mobile station using a plurality of antennas, comprising transmission diversity system control means for determining a transmission diversity system according to information about a channel in an uplink from the mobile station, wherein the information about the channel in the uplink is a channel type, and the transmission diversity system control means uses open loop transmission diversity when the channel type refers to a channel for transmitting voice, and uses closed loop transmission diversity when the channel type refers to a channel for transmitting a packet.

5. The control device according to claim 4, wherein the information about the channel in the uplink is a signal-to-interference power ratio of a physical control channel of the uplink, and a signal-to-interference power ratio of pilot signals, based on at least one of which the transmission diversity system control means determines a transmission diversity system.

6. A mobile communication system which comprises a mobile station, a radio base station for performing wireless transmission to the mobile station using a plurality of antennas, and a radio network controller for controlling the mobile station and the radio base station, and controls execution of transmission diversity of the radio base station, wherein the control device according to claim 5 is provided for at least one of the mobile station, the radio base station, and the radio network controller.

7. A mobile communication system which comprises a mobile station, a radio base station for performing wireless transmission to the mobile station using a plurality of antennas, and a radio network controller for controlling the mobile station and the radio base station, and controls execution of transmission diversity of the radio base station, wherein the control device according to claim 4 is provided for at least one of the mobile station, the radio base station, and the radio network controller.

8. A control device which controls execution of transmission diversity of a radio base station for performing wireless transmission with a mobile station using a plurality of antennas, comprising transmission diversity system control means for determining a transmission diversity system according to information about a channel in an uplink from the mobile station, wherein the information about the channel in the uplink is a transmission rate of a channel in the uplink, an amplitude ratio of a control channel to a data channel, a transmission time interval, a target error rate, and a slot format, based on at least one of which the transmission diversity system control means determines a transmission diversity system, and wherein the transmission diversity system control means uses open loop transmission diversity when the transmission rate of the channel in the uplink is low, and uses closed loop transmission diversity when the transmission rate of the uplink is high.

9. A mobile communication system which comprises a mobile station, a radio base station for performing wireless transmission to the mobile station using a plurality of antennas, and a radio network controller for controlling the mobile station and the radio base station, and controls execution of transmission diversity of the radio base station, wherein the control device according to claim 8 is provided for at least one of the mobile station, the radio base station, and the radio network controller.

* * * * *

UNITED STATES PATENT AND TRADEMARK OFFICE
CERTIFICATE OF CORRECTION

PATENT NO. : 7,613,432 B2  Page 1 of 1
APPLICATION NO. : 11/493563
DATED : November 3, 2009
INVENTOR(S) : Ishii et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Fourteenth Day of December, 2010

David J. Kappos
*Director of the United States Patent and Trademark Office*